US007584287B2

(12) United States Patent
Schneider et al.

(10) Patent No.: US 7,584,287 B2
(45) Date of Patent: Sep. 1, 2009

(54) METHOD FOR DETECTING FRAUDULENT INTERNET TRAFFIC

(75) Inventors: Melissa Schneider, Chicago, IL (US); Arsen Vladimirskiy, Chicago, IL (US)

(73) Assignee: EMERgency,24, Inc., Chicago, IL (US)

( * ) Notice: Subject to any disclaimer, the term of this patent is extended or adjusted under 35 U.S.C. 154(b) by 781 days.

(21) Appl. No.: 10/708,631

(22) Filed: Mar. 16, 2004

(65) Prior Publication Data

US 2004/0153365 A1     Aug. 5, 2004

(51) Int. Cl.
*G06F 15/16* (2006.01)
(52) U.S. Cl. ........................... 709/229; 709/224
(58) Field of Classification Search ........... 709/229
See application file for complete search history.

(56) References Cited

U.S. PATENT DOCUMENTS

| | | | |
|---|---|---|---|
| 6,251,017 | B1 | 6/2001 | Leason et al. |
| 6,405,175 | B1 | 6/2002 | Ng |
| 6,663,105 | B1 | 12/2003 | Sullivan et al. |
| 6,804,701 | B2 | 10/2004 | Muret et al. |
| 2001/0053997 | A1 | 12/2001 | Bain |
| 2001/0054003 | A1 | 12/2001 | Chien et al. |
| 2002/0046092 | A1 | 4/2002 | Ostroff |
| 2002/0052782 | A1* | 5/2002 | Landesmann ............... 705/14 |
| 2002/0065720 | A1 | 5/2002 | Carswell et al. |
| 2002/0069261 | A1* | 6/2002 | Bellare et al. ............. 709/218 |
| 2002/0082911 | A1 | 6/2002 | Dunn et al. |
| 2002/0099600 | A1* | 7/2002 | Merriman et al. .......... 705/14 |
| 2002/0161648 | A1 | 10/2002 | Mason et al. |
| 2003/0037241 | A1 | 2/2003 | Campagna |
| 2003/0083994 | A1 | 5/2003 | Ramachandran et al. |
| 2003/0130892 | A1 | 7/2003 | Taono et al. |
| 2003/0135413 | A1* | 7/2003 | Nishi et al. ............... 705/14 |
| 2003/0167212 | A1* | 9/2003 | Monteverde ............. 705/26 |
| 2003/0195837 | A1 | 10/2003 | Kostic et al. |
| 2003/0216930 | A1* | 11/2003 | Dunham et al. .......... 705/1 |

(Continued)

FOREIGN PATENT DOCUMENTS

EP         1376427 A2 *   1/2004

OTHER PUBLICATIONS

Feng et al., "Comparison of allocation rules for paid placement advertising in search engines", Sep. 2003 Proceedings of the 5th international conference on Electronic commerce ICEC '03, Publisher: ACM Press.*
Heckerman et al., "Targeted advertising with inventory management", Oct. 2000, Proceedings of the 2nd ACM conference on Electronic commerce EC '00, Publisher: ACM Press.*
International Search Rep. Apr. 7, 2006.

*Primary Examiner*—Patrice Winder
*Assistant Examiner*—William J Goodchild
(74) *Attorney, Agent, or Firm*—Seyfarth Shaw LLP

(57) ABSTRACT

A method of detecting fraudulent Internet traffic sent from a first web site to a second web site including providing a first web site database having a list of first web sites likely to send bad traffic, providing a link to the second web site on the first web site, after an Internet user having a web browser clicks on the link, transferring the Internet user to an intermediate web site that gathers information from the Internet user web browser; and determining if a validation request is required.

26 Claims, 2 Drawing Sheets

U.S. PATENT DOCUMENTS

2004/0107363 A1* 6/2004 Monteverde ................ 713/201
2004/0117654 A1* 6/2004 Feldman et al. ............ 713/201
2004/0158528 A1 8/2004 Zuili
2005/0080856 A1* 4/2005 Kirsch ....................... 709/206
2005/0144067 A1* 6/2005 Farahat et al. ................ 705/14
2005/0817818 8/2005 Zito et al.

* cited by examiner

METHOD FOR DETECTING FRAUDULENT INTERNET TRAFFIC

BACKGROUND OF INVENTION

The present invention relates generally to a method for detecting fraudulent Internet related traffic and, more particularly, to a method for detecting if an affiliate web site is likely to send fraudulent traffic to an advertiser web site, in order to fraudulently increase the revenue of the affiliate web site in a "Pay Per Click" system.

Internet related traffic, or visits to a web site by an Internet user, is the main statistic used by an Internet advertiser to determine where to display and how much to pay for its advertisement on another's web site. Typically, the more Internet traffic a web site that is displaying an advertiser's advertisement is receiving, the greater the possibility for the advertiser to have its products or services exposed to potential purchasers. As such, there is an incentive for an advertiser to display its advertisements as immensely as possible in order to reach the broadest potential purchaser base.

A common method of Internet advertising includes charging an advertiser for the exposure of its advertisement to all Internet users regardless if the advertisement resulted in the Internet user actually visiting the advertiser's site by clicking on the advertisement. For example, an advertiser may pay an affiliate site that is willing to display the advertiser's advertisement for the number of times that the advertisement is displayed. While this method of advertising offers a potentially high exposure rate to numerous Internet users, such simplistic exposure to such a large number of Internet users offers little in the form of Internet users generally interested in the advertisement, which would prompt the Internet user to visit the advertiser's Internet site to purchase the advertised product or service. For example, out of 10,000 Internet users that the advertisement was displayed to, if only 10 went to the advertiser's web site to view the advertiser's products or services, the advertiser must still pay for the 10,000 advertisement displays.

It is well known that actual Internet traffic can be used as the main means for determining whether or not compensation should be paid by the advertiser for a referral via an advertisement placed on an affiliate's site, commonly referred to as "Pay Per Click" advertising. With Pay Per Click advertising, the advertiser compensates an affiliate only if an Internet user is actually interested in the advertisement and subsequently visits the advertiser's site by clicking on the advertisement displayed on the affiliate's site. In other words, the advertiser pays the affiliate for displaying the advertisement only if the advertisement is successful in enticing an Internet user to visit the advertiser's Internet site from the affiliate's site. As such, there is an incentive for the advertiser to use affiliates that have the potential to attract as many potential customers as possible, while there is an inventive to the affiliate to attract as many users that would be interested in the advertiser's advertisement in order to increase its revenue.

Since an affiliate's compensation is based proportionally to the number of Internet users that are successfully redirected or referred to the advertiser's site via the advertisement displayed on the affiliate's site, there is an incentive for the affiliate to maximize the amount of referrals. As such, affiliates have devised many schemes and devices that fraudulently cause such referrals. For example, some affiliates have formed "click clubs" that compensate users that are not interested in the advertiser's products or services, to repeatedly click on an advertisement link to the advertiser's site for a small compensation, thus maximizing revenue for the affiliate ("incentivized clicks"). Computer programs are also used to impersonate a human click and thus automate the process of clicking on an advertisement to an advertiser's site ("automated clicks"). In either scenario, the end result is the same in that with such "bad Internet traffic," the advertiser is required to compensate the affiliate because the advertiser cannot differentiate between an actual potential customer that clicks on the link and bad Internet traffic. As such, there is a need to monitor such referrals to increase the actual potential customer base, instead of the affiliate attempting to maximize its revenue with bad Internet traffic.

SUMMARY OF INVENTION

It is an object of the present invention to provide a method for detecting bad Internet traffic that originates from a first web site, such as an affiliate's site, and that is directed to a second web site, such as an advertiser's site.

It is yet another object of the present invention to identify affiliate sites that are commonly known or likely to send bad Internet traffic to an advertiser site.

The present invention is a unique and novel method of detecting and monitoring bad Internet traffic sent from a first web site to a second web site. The present invention provides the ability to quickly and efficiently identify any traffic source that is intentionally sending either automated or incentivized advertisement clicks in order to maximize an affiliate's Pay Per Click revenue. Once the fraud source is identified, the Pay Per Click provider can block the fraud source from sending future bad Internet traffic on advertiser listings.

The present invention may use a plurality of elements to "validate" a traffic source to determine if it is likely sending bad Internet traffic to a second website. Such elements may include data gathered from advertisement clicks, information gathered from survey forms that are displayed to Internet users, a database including known bad Internet traffic sites, and subsequent administrative analysis of the gathered data. From the gathered data, it may be determined to denote an affiliate site as a known or likely generator of bad Internet traffic and place it into the bad traffic database, thus preventing further bad Internet traffic from that affiliate site.

BRIEF DESCRIPTION OF DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages, should be readily understood and appreciated.

DETAILED DESCRIPTION

The present invention is a method of detecting or monitoring bad Internet traffic directed from a first web site to a second web site. The present invention identifies traffic sources that are likely sending automated or incentivized clicks, such as with hypertextual links or advertisements displayed on a first web site to a second web site. Once a fraudulent source is identified, the fraud source can be blocked from sending future bad Internet traffic on advertiser listings.

In an embodiment, a method of detecting likely bad Internet traffic sent from a first web site to a second web site is provided. In an embodiment, a typical Pay Per Click Internet advertisement system may be employed in that the first web site may be an affiliate that displays an advertisement or hypertext link to an advertiser and the second web site may be the advertiser. It will be appreciated that while the present application discusses the present invention in terms of a Pay Per Click advertisement system, the present invention can be employed and used in any first web site sending or referring Internet traffic to a second web site system. Accordingly, it will be understood that the terms "first web site" may be used interchangeably with affiliate web site and "second web site" may be used interchangeably with "advertiser site," without departing from the true scope and spirit of the present invention.

Figure 1:
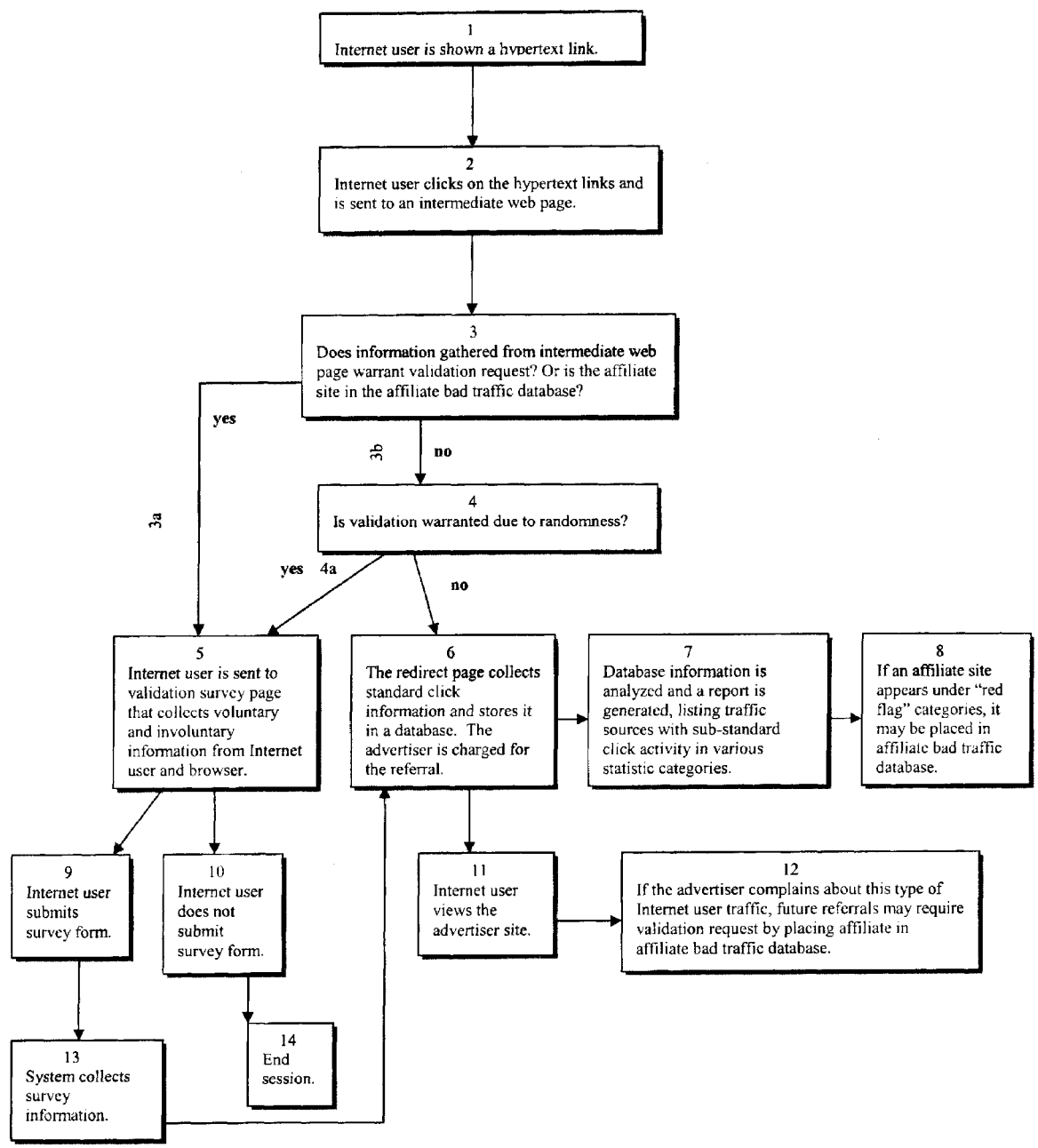
FIG. 1 is a flowchart depicting the preferred detection of bad Internet traffic method of the present invention.
Figure 2:
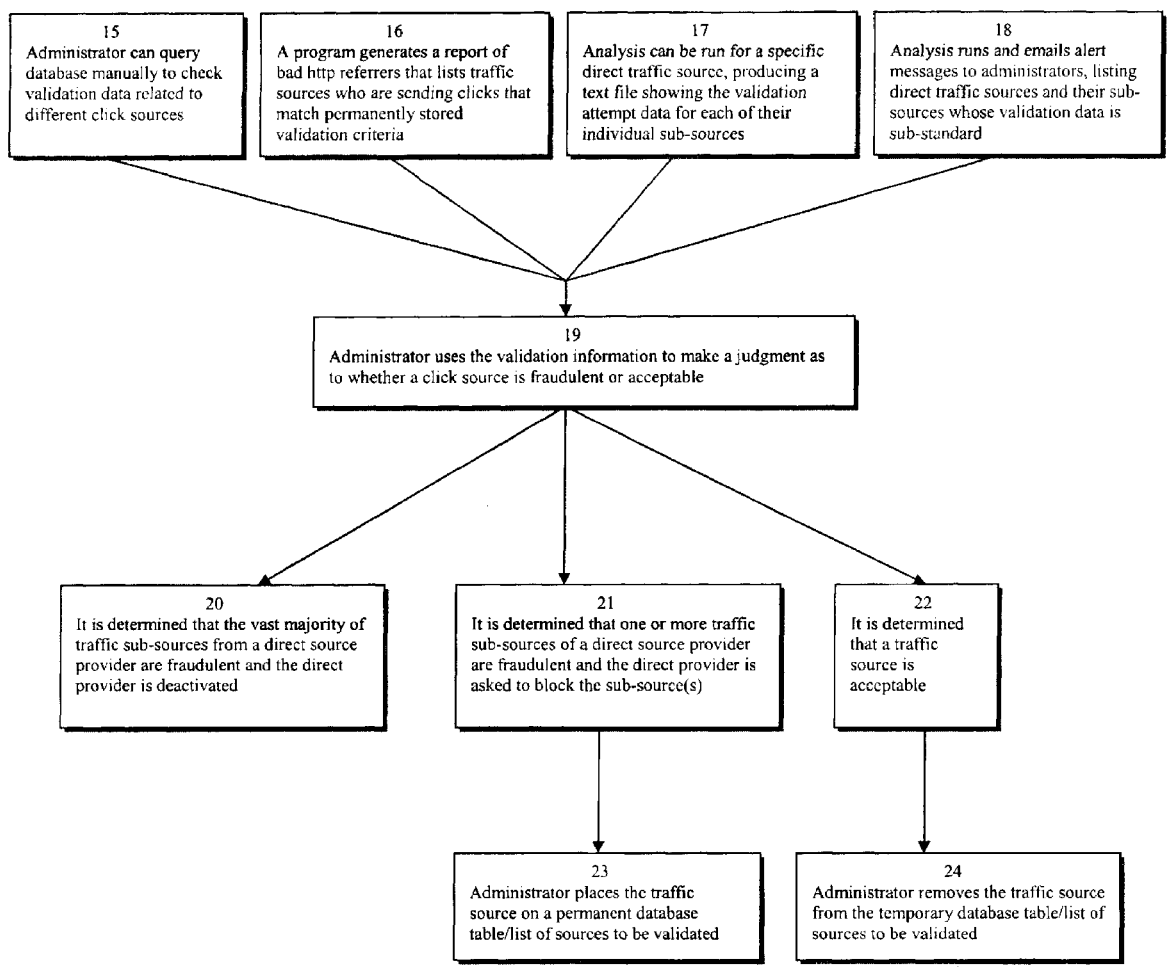
FIG. 2 is a flowchart depicting the preferred analysis of gathered data in determining if a web site is likely to send bad Internet traffic of the present invention.

Referring to FIG. 1, the method includes providing an affiliate site that has at least one hypertext link or advertisement link to an advertiser site 1. In an embodiment, the affiliate site may display a link, such as an advertisement, to the advertiser site after receiving a keyword search from the Internet user. In such an embodiment, the affiliate site receives a keyword search from the Internet user, prepares a result list based upon the keyword search and then provides at least one link on the affiliate site that is relevant or related to the keyword search. In such an embodiment, before a referral click occurs, an Internet user has already shown an interest in a given topic through the use of a keyword.

The method further includes providing an affiliate bad traffic database that has a listing of affiliate sites that are known or likely to send bad Internet traffic to advertiser sites. The method also includes transferring the Internet user to an intermediate web site, after the Internet user clicks on the link or advertisement placed on the affiliate site, 2 that gathers information from the Internet user's web browser in order to determine if a validation request is required in order to detect if the affiliate site is likely sending bad Internet traffic 3. The intermediate web site may include a redirect page that is not immediately displayed to the Internet user but is rather hidden in that the Internet user does not necessarily realize that there was an intermediate page. In other words, the intermediate page may be configured to determine if a validation request is required without the Internet user's knowledge or input into such determination.

If information gathered from the intermediate web page indicates that a validation request is warranted, then a validation request may be initiated 3a. If information gathered from the intermediate web page indicates that a validation request is not warranted, a validation request may nonetheless be randomly initiated 4. However, it is anticipated that most non-suspect referral clicks do not require validation and follow a standard sequence of events wherein the intermediate web site simply collects information 6 and causes the transfer of the advertiser site to the Internet user without any further intervention 11. In another embodiment, validation requests may automatically be initiated for many reasons, such as, for example, an advertiser complains about the amount or quality of an affiliate's traffic, an affiliate has a sudden surge of Internet traffic directed to an advertiser web site, an affiliate has an unusually low conversion rate (the amount of actually interested consumers compared to the amount of clicks), the Internet browser information for clicks is identical even though their respective Internet protocol addresses are different (typically indicating that a single Internet user is using a plurality of IP address), data gathered from a prior random validation request is not satisfactory, or if the affiliate site is placed within the affiliate bad traffic database.

Information that may be gathered by the intermediate web site from the Internet user's browser in order to determine if a validation request is warranted or if an affiliate site is likely to send bad Internet traffic may include, among other things, the date and time of the click, the advertiser's Uniform Resource Locator (URL), the input keyword, the Internet user's Internet Protocol address (IP), the affiliate's identification number, the type of keyword service that is used (e.g. a input search box or a textual link), the compensation that the affiliate receives if the affiliate successfully causes an Internet user to click on an advertisement or link, the numeric ranking of the advertisement relative to other advertisement listings, the URL of the web page that the Internet user visited prior to viewing the displayed advertisement, the "http_user_agent" or Internet browser information (e.g. Internet browser type and version), the "http_accept_language" or Internet user's browser language preference, the amount of time the Internet user spends on the advertiser site, if the Internet user's browser has cookies enabled, the number of times that the affiliate site refers the Internet user to the advertiser site, if there is mouse movement, if the referred advertiser is relevant to a keyword search conducted by the Internet user, and an Internet user identification that is subsequently tracked and recorded through the use of Internet cookies.

An example of information that may be gathered from the Internet user's browser may be in the form of an Internet link, such as:

http://www.revenuepilot.com/jsp/index.jsp?keyword=Rings&id=1394&filtered=yes. In this example, the URL of the web page where the Internet user viewed and clicked on the advertisement is "revenuepilot.com" and the affiliate identification number is 1394. Further in this example, the searched keyword ("Rings"), the affiliate ID ("1394"), and the advertiser's URL are embedded in the advertiser's listing link and are later stored in a database as part of the information for later analysis.

Once a validation request is initialized, a survey, typically in the form of an Internet pop-up that requires manual entries to be inserted by the Internet user 5, may be used. The validation survey may collect voluntary and involuntary information from the Internet user as well as click details. The survey may, for example, request the Internet user to manually answer information pertaining to what keyword was searched for, what paid-to-surf program an Internet user is using, or other general questions which require human interaction such as is the Earth flat or round or asking the Internet user to replicate alphanumeric characters shown in an image. Involuntary information about the Internet user may be collected such as the width and height of the survey pop-up window, whether the Internet user moved its mouse over any portion of the survey window, whether the Internet user's browser had cookies-acceptance enabled, the Internet user's browser information, and how many seconds the Internet user remained on the survey form before submitting the information. Further information that is collected may include the affiliate identification that referred the Internet user and the advertiser identification that had its advertisement displayed on the affiliate site.

If the Internet user submits the survey information, the information is gathered from the survey and stored in a survey database for subsequent analysis 13. At this point, the Internet user is redirected back to the intermediate page where the Internet user and browser information is collected and stored for subsequent analysis 6, the Internet user is redirected to the desired advertiser site 11, and the affiliate site will be compensated by the advertiser site for the referral. If, on the other hand, the survey form is displayed and the Internet user does not submit it, the advertiser web site is not caused to be transmitted to the Internet user, the advertiser does not compensate the affiliate for a referral and the session terminates 14.

Information gathered from the intermediate web page 6 and survey submissions 13 may be subsequently analyzed. Such an analysis may, for example, predict the quality of the advertisement referrals sent from an affiliate's site. For example, if an affiliate's referral traffic has poor percentages in a category, the affiliate's information may be listed in the affiliate bad traffic database which will subsequently cause a validation request to be initiated on future referrals 3a. Such categories may includes, for example, an analysis of unique IP addresses compared total clicks, indicating the number of unique Internet users, unique Internet users compared to the total clicks, average cost per click, missing http_referer information indicating a fraudulent source, clicks to searches ratio, total relative browser language clicks, and percentage of clicks coming from a single IP address. If an analysis of the information warrants future validation requests from an affiliate site, only a portion of referrals sent from an affiliate site to an advertiser site may require validation. In another embodiment, all referrals sent from an affiliate site to an advertiser site will require validation.

In an embodiment, validation requests can be automatically initiated based upon the affiliate identification number, the domain or sub-affiliate identification information found in the http_referer, or advertiser URL, which may be located in the affiliate bad traffic database. For example, if referral traffic from an affiliate site is suspected to be bad Internet traffic, the affiliate identification information can be inserted into the affiliate bad traffic database, thus requiring a validation request to be initiated on subsequent referrals that match that affiliate identification information. In another example, if an advertiser is particularly vulnerable to bad Internet traffic, the advertiser's URL can be placed in the affiliate bad traffic database to require validation requests on subsequent referrals for advertisers that match the advertiser's URL. In yet another example, if a sub-affiliate (an affiliate of an affiliate site) is suspected of causing bad Internet traffic, the sub-affiliate's identification information or domain name, as extracted from the http_referer information, can be placed in the affiliate bad traffic database in order to require validation requests on future referrals for affiliate sites that match the subaffiliate's identification information.

As an illustration, if an affiliate site having an affiliate identification number of 41867 and data extracted from the Internet user's browser indicate a language preference of Russian, because the referred advertiser site is in English, it would be likely that these Russian language referrals are bad Internet traffic because the Internet users would not likely be able to read and understand the content. After further examination, the administrator may determine that most of the Russian referrals have http_referers similar to:

http://www.chocolateicecream.com?kywd=banana+flavor &id=4456&x=no. Here, the http_referer information obtained from the Internet user's browser indicates that clicks emanating from "chocolateicecream.com" appear to have Russian language data when the sub-affiliate id "4456" is found in the click's http_referer information. As such, the sub-affiliate identification number of "id=4456" can be placed in the affiliate bad traffic database in order to require future validation requests for all referrals having http_referer information containing "id=4456." In yet another illustration, the information obtained from the http_referer http://www.chocolateicecream.com?kywd=banana+flavor &id=4456&x=no may indicate that the affiliate domain of "chocolateicecream.com" may be the source of bad Internet traffic. In this case, the domain name "chocolateicecream.com" can be placed into the affiliate bad traffic database and require future validation requests for all referrals having http_referer information containing the domain name "chocolateicecream.com." While in either scenario, a validation request will be initiated if the http_referer information matches the set criteria, a properly executed and completed survey form by the Internet user will still result in the Internet user being redirected to the clicked advertisement site. In another embodiment, if the http_referer information matches the set criteria, the traffic can immediately be prevented an the Internet user's session can be terminated to prevent a referral to the advertiser site.

Subsequent analysis of the information obtained from the Internet user's browser and completed survey forms may yield a determination that an affiliate is likely to send bad Internet traffic to an advertiser site. For example, if it is recorded that an advertiser site has 552 total referrals, out of which 247 were referred by the affiliate "chocolateicecream.com," and out of the 247 only 10% recorded mouse movement with the survey form, it can be deduced that the affiliate site "chocolateicecream.com" is likely sending bad Internet traffic through the use of an automated program because the survey form mouse movement is unexpectedly low.

In an embodiment, analysis of the information obtained from the Internet user's browser and completed validation surveys can be completed via a computer program. The computer program may provide a summarized or detailed analysis of an affiliate site's traffic for review. For example, the computer program may generate a report in the form of a typical text file that shows validation statistics analyzed by domain names or affiliate identification information found in the http_referer. The computer may, for example, summarize or analyze the number of validation survey requests initiated, the percentage of those surveys that were completed and submitted by the Internet user, the percentage of the validation surveys that detected mouse movement, the percentage of validation surveys that were from Internet browsers with cookies enabled, answers input by the Internet user to a paid-to-surf program name question, or a comparison between what the Internet user input it was searching for and the advertisement that was used. Once analysis of the information has been completed, bad Internet traffic sources can be identified and an affiliate site that is prone to send such bad Internet traffic can be dealt with. For example, if an affiliate site's human response rate is low, the affiliate site may be requested to block such bad Internet traffic source from showing the advertisement, especially if the mouse movement rate is low or if the cookies enabled rate is low or high, which would typically signify automated clicks. Further, if it determined that an affiliate site is uncooperative or if all of the affiliate's site referrals are bad Internet traffic, affiliate site's account may be canceled wherein the affiliate site will no longer receive compensation for any advertisement referrals.

It will be appreciated that the above listed examples and illustrations are for exemplification purposes only and are not intended to limit the scope and spirit of the present application.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants" contribution. The actual scope of the protection sought is intended to be defined in the following claims when viewed in their proper perspective based on the prior art.

The invention claimed is:

1. A method of detecting fraudulent Internet traffic sent from a first web site to a second web site comprising:
   providing a first web site database having a list of first web sites likely to send bad traffic;
   providing a hypertext link to the second web site on the first web site;
   transferring an Internet user to an intermediate web site after the Internet user clicks on the hypertext link on the first web site;
   gathering information at the intermediate web site from the Internet user to determine if the first web site is found in the list of first web sites likely to send bad traffic; and
   performing at least one of the following steps:
      providing a validation request to the Internet user if the first web site is found in the list of first web sites likely to send bad traffic; and
      transferring the Internet user to the second web site if the first web site is not in the list of first web sites likely to send bad traffic.

2. The method as claimed in claim 1 wherein the validation request includes providing a survey form with at least one input for the Internet user to input information.

3. The method as claimed in claim 2 wherein the validation request includes collecting the input information into a survey database.

4. The method of claim 3 wherein the validation request includes analyzing the input information in the survey database to determine if the first web site should be listed in the first web site database.

5. The method as claimed in claim 4 further comprising causing the transmission of the second web site to the Internet user.

6. The method as claimed in claim 5 further comprising compensating the first web site for causing the transmission of the second web site to the Internet user.

7. The method as claimed in claim 1 further comprising the step of randomly providing the validation request to the Internet user even if the first web site is not found in the list of first web sites likely to send bad traffic.

8. The method as claimed in claim 7 wherein the validation request includes providing a survey page with at least one input for the Internet user to input information.

9. The method as claimed in claim 8 wherein the validation request includes collecting the input information into a survey database.

10. The method as claimed in claim 9 further comprising causing the transmission of the second web site to the Internet user after the Internet user has completed the validation request.

11. The method as claimed in claim 10 further comprising compensating the first web site for causing the transmission of the second web site to the Internet user.

12. The method as claimed in claim 1 wherein the first web site is an affiliate web site.

13. The method as claimed in claim 12 wherein the second web site is an advertiser web site.

14. The method as claimed in claim 13 wherein the step of providing a hypertext link to the second web site includes receiving a keyword search from the internet user, preparing a result list relevant to the keyword search, and providing at least one hypertext link on the first web site that is relevant to the keyword search.

15. The method as claimed in claim 13 wherein the hypertext link includes an advertisement of the advertiser web site.

16. The method as claimed in claim 1 wherein the intermediate web site includes a redirect page capable of determining if the validation request is required.

17. The method as claimed in claim 1 further comprising compensating the first web site for causing the transmission of the second web site to the Internet user.

18. A method of determining if an affiliate web site sends bad traffic to an advertiser web site in a system comprising an affiliate web site providing an advertiser link to an advertiser web site, the affiliate web site receiving compensation if an Internet user having a web browser clicks on the advertiser link and causes the transmission of the advertiser web site to the Internet user, the method comprising:
   determining if the web browser has cookies enabled;
   determining a language of the web browser;
   determining an amount of time that the Internet user spends on the advertiser web site;
   determining a total amount of times that the affiliate web site causes the transmission of the advertiser web site to the Internet user; and
   analyzing at least one of the web browser cookies, the language of the web browser, the amount of time the Internet user spends on the advertised website and the total amount of times the affiliate web site causes the transmission of the advertiser web site to the Internet user to determine if the affiliate web site is likely to send bad traffic; and
   adding the affiliate web site to a list of affiliate web sites likely to send bad traffic if the affiliate is determined as likely to send bad traffic, wherein a subsequent Internet user referred from the affiliate web site is required to respond to a validation request prior to the transmission of the advertiser web site to the subsequent Internet user.

19. The method as claimed in claim 18 further comprising determining if the Internet user causes a mouse operably coupled to the Internet user web browser to move.

20. The method as claimed in claim 18 further comprising determining if the Internet user receives an incentive from the affiliate web site for clicking on the advertiser link.

21. A method of determining if an affiliate web site sends bad traffic to an advertiser web site, the method comprising the steps of:
   receiving at an affiliate web site a keyword search from an Internet user having a web browser;
   providing at least one advertiser link to an advertiser web site on the affiliate web site;
   transferring an Internet user to an intermediate web site alter the Internet user clicks on the advertiser link on the affiliate web site;
   gathering information at the intermediate web site from the Internet user to determine the keyword search;
   electronically comparing the keyword search to the advertiser web site to detect bad traffic by determining if the keyword search is relevant to the advertiser web site; and
   performing at least one of the following steps:
      providing a validation request to the Internet user if the keyword search is not relevant to the advertiser web site; and
      transferring the Internet user to the advertiser web site if the keyword search is relevant to the advertiser web site.

22. The method as claimed in claim 21 further comprising determining a total amount of times that the affiliate web site causes the transmission of the advertiser web site to the Internet user.

23. The method as claimed in claim 21 further comprising determining ii the Internet user causes a mouse operably coupled to the Internet user web browser to move.

24. The method as claimed in claim 21 further comprising determining if the internet user receives an incentive from the affiliate web site for clicking on the advertiser link.

25. The method as claimed in claim 21 further comprising determining if the web browser has cookies enabled.

26. The method as claimed in claim 21 further comprising determining a language of the web browser.

* * * * *